(No Model.)

L. B. WHITE.
BALL CASTER.

No. 528,266.    Patented Oct. 30, 1894.

Witnesses.
Richmond P. Emmett.
George P. Cressy

Inventor.
Lewis B. White
per D. M. Small, attorney

UNITED STATES PATENT OFFICE.

LEWIS B. WHITE, OF RIVERSIDE, RHODE ISLAND.

BALL-CASTER.

SPECIFICATION forming part of Letters Patent No. 528,266, dated October 30, 1894.

Application filed May 29, 1894. Serial No. 512,830. (No model.)

*To all whom it may concern:*

Be it known that I, LEWIS B. WHITE, a citizen of the United States, and a resident of Riverside, in the county of Providence and State of Rhode Island, have invented an Improvement in Furniture-Casters, of which the following is a specification.

Figure 1:
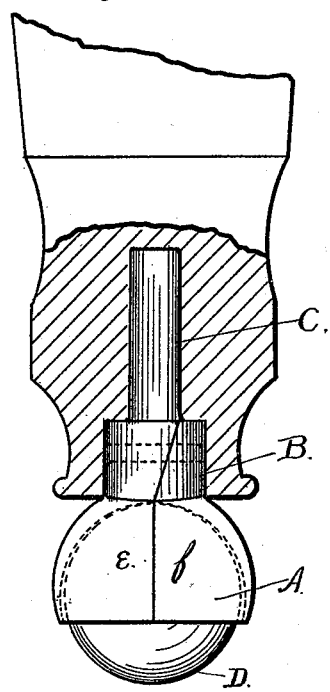
Figure 2:
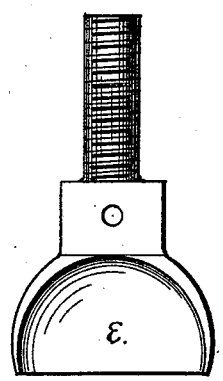
Figure 3:
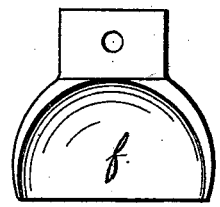

In the accompanying drawings which form a part of this specification, Figure 1 shows my caster in connection with a portion of table leg. Figs. 2 and 3 are the two parts which form the socket A, shoulder B and spindle C.

My invention relates to that class of casters in which a ball is loosely held so as to be free to turn in any direction within a suitable socket; and consists of the particular construction and combination of socket, spindle, and ball as hereinafter described and claimed, my object being to strengthen the caster and render it more effective.

Wooden balls are far preferable to all others and are all that could be desired for lightness, practical working and cheapness.

The socket A is cast in two parts $e$ and $f$. Shown in Figs. 2 and 3. The shoulder B is also cast in two parts but the spindle C is (preferably) cast whole in connection with one portion of the shoulder, to make it stronger than it would be if cast in two parts, the shoulder being so divided as to bring this shank or spindle in or above the center of socket and ball as shown in Fig 1.

The two parts when riveted together through shoulder B (made for this porpose and to avoid splitting spindle C) form a socket which loosely holds the ball as stated.

The spindle C is preferably cast with a thread as indicated in Fig. 2 though it can be made plain if desired.

What I claim as new, and desire to secure by Letters Patent, is—

The combination in a ball caster of a metal socket A composed of two parts $e$ and $f$, shoulder B also composed of two unequal parts, spindle C cast entire in connection with one of these parts, and wooden ball D, all constructed and arranged so as to operate substantially as described.

LEWIS B. WHITE.

Witnesses:
DEXTER M. SMALL,
WM. M. BROWN.